June 22, 1965

W. O. OLSON 3,190,255

DEMOUNTABLE OUTBOARD COMBINATION HULL
BOAT AND SLED DRIVING MEANS

Filed Nov. 26, 1963

INVENTOR.
WINSTON O. OLSON

BY

ATTORNEY

June 22, 1965
W. O. OLSON
3,190,255
DEMOUNTABLE OUTBOARD COMBINATION HULL
BOAT AND SLED DRIVING MEANS
Filed Nov. 26, 1963
4 Sheets-Sheet 2
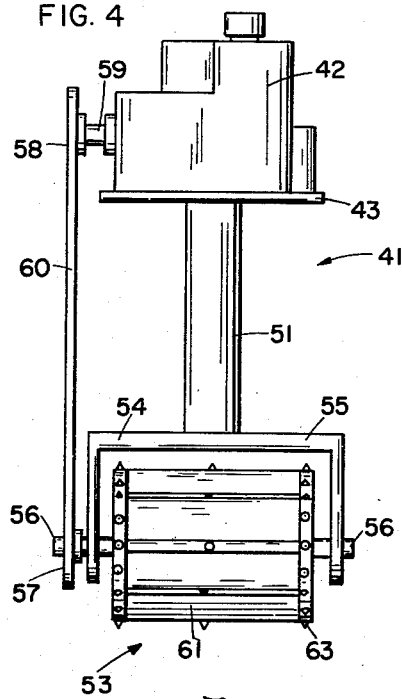
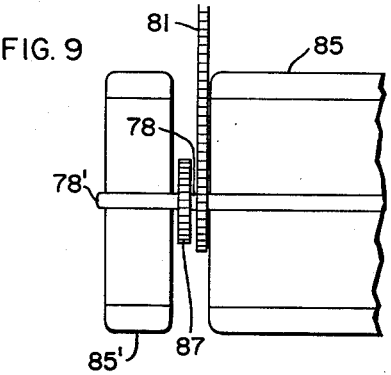
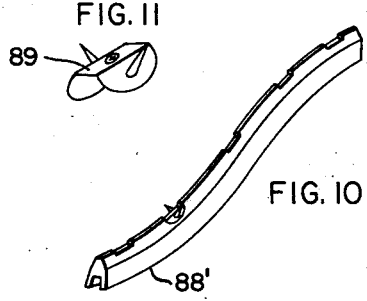
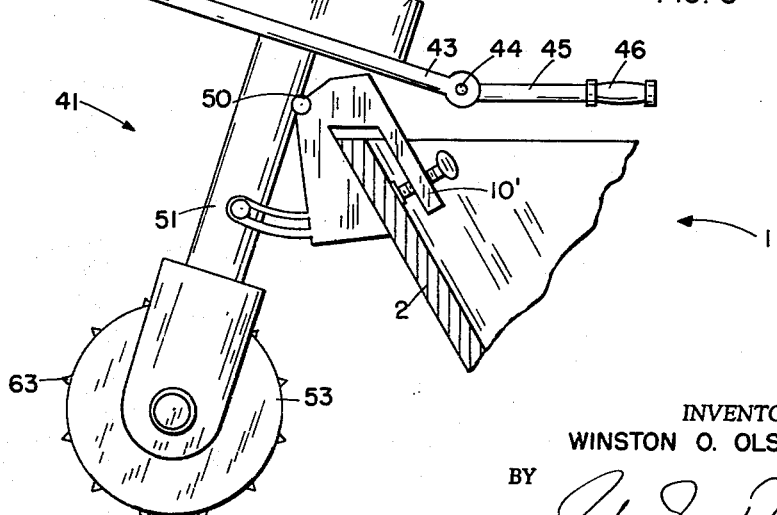
INVENTOR.
WINSTON O. OLSON
BY
ATTORNEY June 22, 1965
W. O. OLSON
3,190,255
DEMOUNTABLE OUTBOARD COMBINATION HULL
BOAT AND SLED DRIVING MEANS
Filed Nov. 26, 1963
4 Sheets-Sheet 3
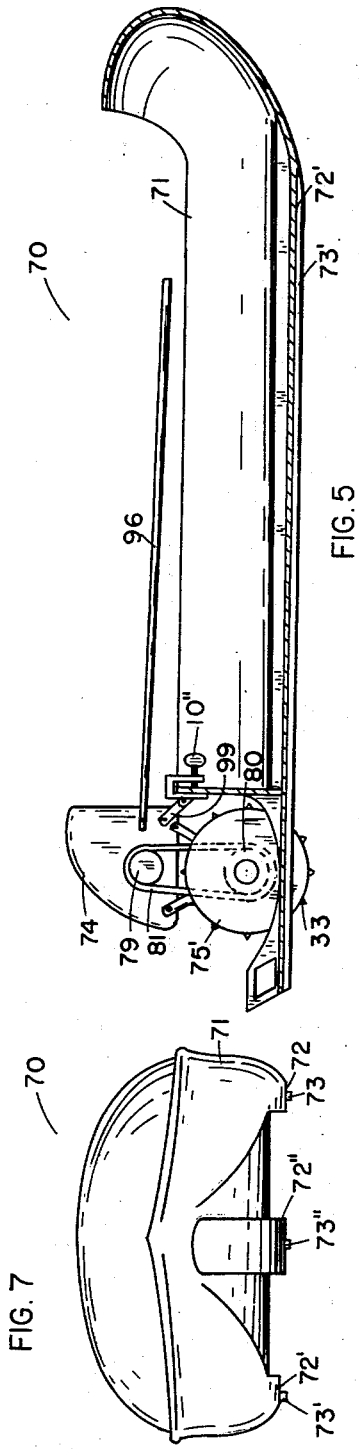
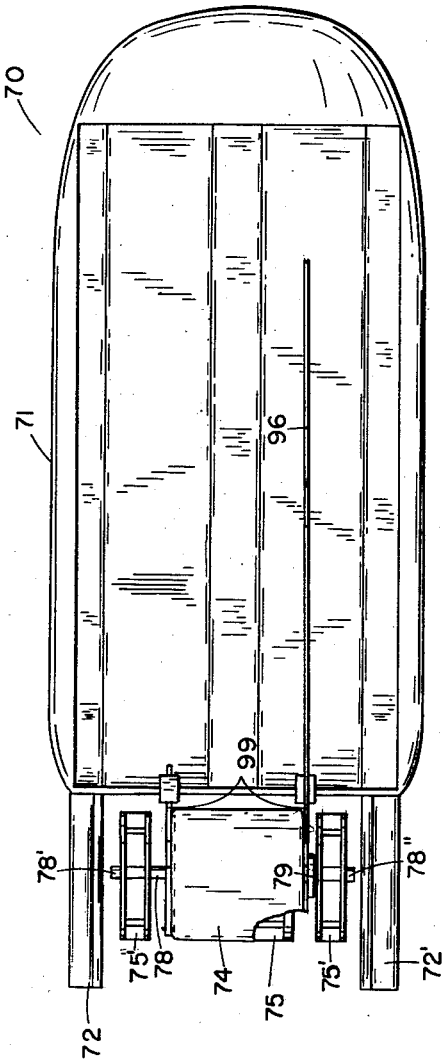
INVENTOR.
WINSTON O. OLSON
BY
ATTORNEY June 22, 1965

W. O. OLSON 3,190,255

DEMOUNTABLE OUTBOARD COMBINATION HULL
BOAT AND SLED DRIVING MEANS

Filed Nov. 26, 1963

INVENTOR
WINSTON O. OLSON

By

ATTORNEY

United States Patent Office 3,190,255
Patented June 22, 1965

3,190,255
DEMOUNTABLE OUTBOARD COMBINATION HULL BOAT AND SLED DRIVING MEANS
Winston Orine Olson, 412 Hilton Drive, Madison, Wis.
Filed Nov. 26, 1963, Ser. No. 327,579
13 Claims. (Cl. 115—1)

This invention relates to an improved driving means adapted to be demountably attached to a boat to drive the boat as a sled on the surface of ice or to drive it in water, alternatively at will, and without making any change in the hull, the driving means, or demounting means in order to make the transposition from operation on ice to operation on water or vice versa.

This application is a continuation-in-part of my application Serial Number 196,843 entitled "Powered Surface Transportation" filed May 14, 1962 which was a continuation of application Serial Number 6,656, having the same title, filed February 4, 1960, both applications now abandoned.

It is an object of the invention to provide demountable or detachable driving means and more specifically a demountable or detachable driving unit comprising an engine and driving device which may be utilized with a conventional boat hull or may be utilized with a specially designed boat hull, the boat hull being adapted to serve alternatively and without change as either a boat for operation as a displacement hull in water, or to operate as a sled by sliding upon the surface of ice.

It is another object to provide such means which are demountable for attachment to any suitable hull and which may suitably be operated in the absence or presence of either ice or water.

It is a further object to provide such driving means which will suitably engage water, when operating on water, to provide adequate forward propulsion force, and which will suitably engage ice when operating on ice, and which may suitably be steered in order to determine the direction of travel of the hull whether operating as a boat or a sled, said steering being accomplished in identical manner for operation either on water or on ice.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 3 is a view corresponding to that of FIGURE 1, of a modification of the embodiment of FIGURE 1;

FIGURE 4 is a view corresponding to that of FIGURE 2 with the driving means almost entirely rotated to cause the hull to travel nearly in a circle with the driving means being in a position most suitable for operation in water;

FIGURE 5 is a side view of another embodiment;

FIGURE 6 is a top view of the embodiment of FIGURE 5;

FIGURE 7 is a front view of the embodiment of FIGURES 5 and 6, showing a hull particularly suitable for use with the driving means of the invention when the hull is to be operated primarily as a sled and only occasionally as a boat;

FIGURE 9 is a schematic view from the rear of the embodiment of FIGURE 8;

FIGURE 10 is a fragmentary perspective view of a blade edge of the embodiment of FIGURES 8 and 9;

FIGURE 11 is a perspective view of one of a number of replaceable members which may be attached to the member of FIGURE 10.

Figure 1:
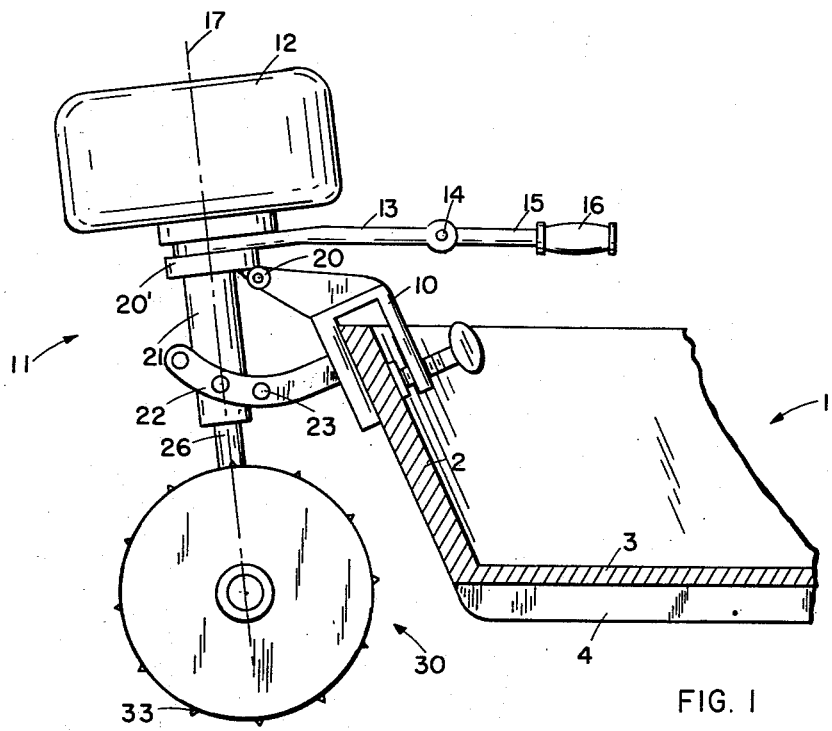
FIGURE 1 is a side elevation of one embodiment attached to a hull, a fragmentary cross-sectional portion of the stern being shown.
Figure 2:
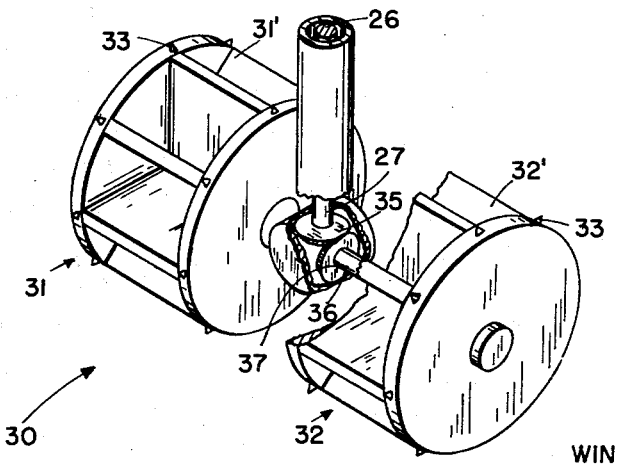
FIGURE 2 is a partially fragmentary, partially cutaway perspective view of the embodiment of FIGURE 1.

Referring now to FIGURES 1 and 2, boat hull 1 comprises transom 2 and bottom 3. It may be provided with one or more skids extending longitudinally such as keel or keelson 4. Similar skids or runners may be provided at the chines. Clamped to transom 2 by clamping device 10 there is provided driving means indicated generally as 11 which comprises motor 12, a tiller or steering arm 13 which may have attached thereto by any suitable means such as by hingeable attachment at 14, an extension 15 which may be provided with handle portion 16 at its end for causing device 11 to rotate hingeably about axis 17. Portion 20' of driving means 11 may be hingeably attached at 20 to clamp means 10 to provide for the rotation of means 11 around the axis of hinge 20. Drive means 11 may comprise sleeve 21 attached to hinge portion 20'. The bottom of sleeve 21 may extend between arms 22 which may extend backwardly from clamp means 10 and may be provided with suitable means such as means 23 to provide for the adjustment of axis 17 to any desired position with respect to the vertical or with respect to transom 2. Upwardly extending support housing 26 may extend slidably within tube 21 and may connect motor 12 with driving wheel unit indicated generally as 30. Within housing 26 there may be provided a drive shaft 27. Drive wheel means 30 may comprise wheel 31 and wheel 32, each of which may comprise paddles 31' and 32' respectively. Around the circumference of each of wheels 31 and 32 there may be provided ice engaging pointed members 33. At least one such member is preferably provided for each blade and there may be provided also or alternatively a plurality of members along the edge of each blade or there may be provided a plurality of members 33 at the peripheries of the wheels adjacent the ends of each blade as shown. Shaft 27 may be provided at its bottom end with bevel gear 35, to suitably engage bevel gear 36, mounted on horizontal shaft 37, wheels 31 and 32 being rigidly attached to horizontal shaft 37. Steering may readily be accomplished, in operation, by moving tiller 13 laterally to cause rotation of drive means 11 about axis 17, with housing 26 rotating within sleeve 21, whereby the angle of shaft 37 with respect to the hull is thereby changed and consequently the driving force of the wheels is directed somewhat to one side or the other, consequently driving the transom in the same direction and causing the hull to assume a new heading.

A sled may be suitably used in place of a hull. It may be provided, if desired, with attached buoyant means, such as tanks, to cause it to float if it breaks through the ice. It may, if desired, have the form of a raft which may, if desired, be of plastic foam provided with runners.

Referring now to FIGURES 3 and 4 there is shown another embodiment wherein driving means indicated generally as 41 comprises motor 42 mounted on plate 43, to which there is attached by any suitable means such as hingeable means 44 a tiller or steering arm 45, which may be provided with a handle 46. Clamp means 10' may be provided to attach driving means 41 to the transom of the boat, and hingeably attached at hinge 50. To clamp means 10' there may be provided upwardly extending supporting member 51 which may attach plate 43 to supporting members 54 and 55 which may extend outwardly and downwardly to near the ends of horizontal shaft 56 to which there may be attached blades or paddles 61.

Circumferentially around wheel 53 there may be provided pointed member 63 for engaging the surface of the ice. Shaft 56 may be rotatably mounted in the lower ends of members 54 and 55. A sprocket 57 may be attached to the end of shaft 56. A sprocket 58 may be attached to the end of drive shaft 59 which may extend from motor 42 so that motor 42 may rotatably drive wheel 53 by the action of chain 60 trained over sprockets 57 and 58.

In the embodiment of FIGURES 3 and 4 pressure is applied to the driving wheel to engage the ice by the operation of the wheel itself (or a spring, or both), causing the motor to move from tilted position toward the vertical position to lift the stern of the boat and thus cause the stern of the hull to exert greater and greater pressure on the ice. In operating in water, the force of the wheel, the force of gravity and the force of said spring, if a spring is used, automatically cause the device to assume a vertical position or a position more nearly parallel to the transom than the position shown in FIGURE 4, so that the wheel is deep enough in the water. This is in contradistinction to the situation in FIGURE 1 wherein a vertical mounting housing slides in a sleeve so that the weight of the engine at the top of the vertical mounting housing is the principal force which is applied to the wheel to cause it to engage the ice and drives the wheel down into the water so that the paddles fully engage in the water in order to cause the hull to move adequately as a boat.

Referring to FIGURES 5, 6 and 7, a hull 70 is provided with a high bow 71 to provide protection of the occupants from flying wind and snow, and is provided with ski members 72, 72' and 72" and runner members 73, 73' and 73" which may if desired be provided as integral parts of the hull, to facilitate operation of the hull as a sled on ice.

Skis 72 and 72' may run the entire length of hull 70 and may extend rearwardly beyond and to either side of the steerable wheels 75 and 75'. Skis 72 and 72' and 72" may have attached thereto runners 73, 73' and 73" respectively. Runners 73, 73' and 73" preferably extend below the flat surface of the skis and may run the entire length of the skis as shown. Ski 72" may be fixedly attached to hull 70 midway between skis 72 and 72' and may run parallel to skis 72 and 72'. Ski 72" terminates at the rear extremity of hull 70. Skis 72, 72' and 72" all lie in the same horizontal plane so that when hull 70 is traveling on snow and the like all three skis are in contact with the surface of travel and runners 73, 73' and 73" are projected into the surface of travel thereby greatly reducing the tendency of vehicle 10 to slide sideways when traversing the side of hill, this effect being analogous to a skier edging his skis into the hill when traversing said hill. When vehicle 70 is operated over a hard surface such as crushed snow or ice, runners 73, 73' and 73" do not project into the hard surface of travel and therefore the flat surfaces of skis 72, 72' and 72" are raised above the surface of travel and operation is then analogous to that of a sled or ice boat.

A drive unit in accordance with the invention may comprise an air cooled engine enclosed within housing 74. Clamp means 10" are provided near each side of housing 74 for attaching the drive unit to the transom of hull 71. The drive unit is attached to hull 71 by means of links 99, each of which is pivotally mounted at one end to housing 74 and at the other end to one of clamp means 10" so that the drive unit is free to rotate in three modes with respect to the hull, the modes corresponding to yaw, pitch and roll with respect to the hull. Thus, rotation in the mode corresponding to yaw is permitted by a downward hinging movement of one link and a corresponding upward hinging movement of the other link and steering may thus be accomplished. Rotation on a transverse axis with respect to the transom, that is, rotation in a mode corresponding to pitch with respect to the hull is provided for by pivotal motion at both ends of each link. The drive unit is also adapted to move vertically up and down in order to adjust itself to the terrain by reason of pivotal action at the ends of links 99.

Rotatably mounted and fixedly spaced from housing 74 there is provided a transverse shaft 78. The means whereby such rotatable mounting and fixed relationship to the housing 74 is provided is indicated, but for the sake of simplicity, for the most part not shown. Sprocket or sheave 79 may be attached to a driven shaft extending from the motor within housing 74 and sprocket or sheave 80 may be provided on shaft 78 and may be driven by chain or V-belt 81 trained over 79 and 80. Paddle wheel 75 is rigidly affixed to shaft 78.

Figure 8:
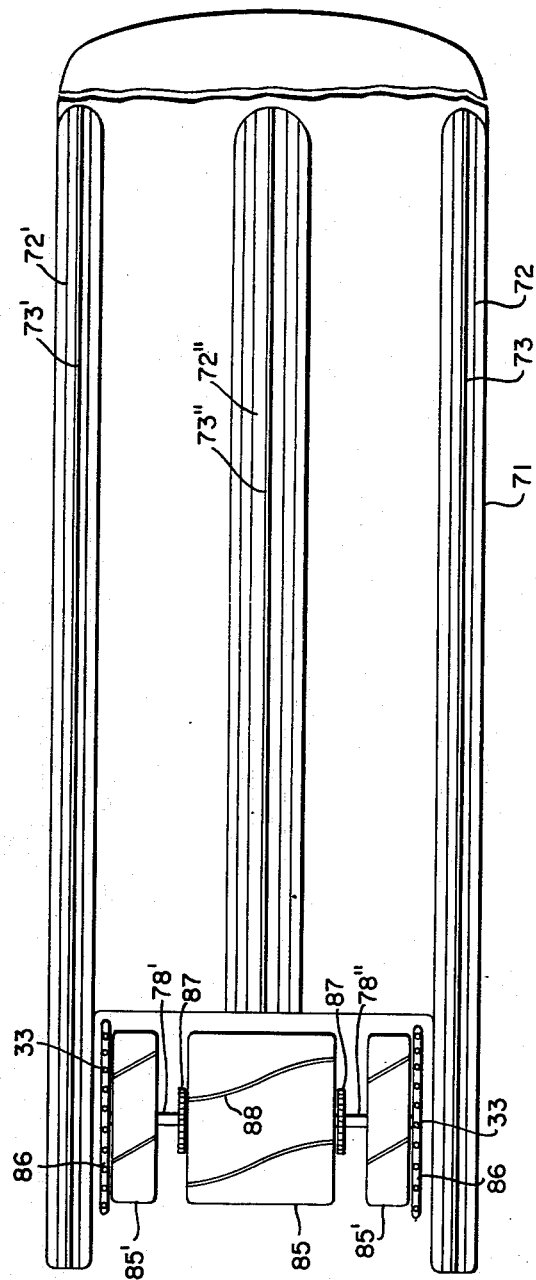
FIGURE 8 is a schematic bottom view of a modification of the embodiment of FIGURES 5, 6, and 7.

Shaft 78 may be provided with extending portions 78' and 78" at each end which may have rigidly affixed thereto paddle wheels 75'. Shafts 78' and 78" may be integral with shaft 78 as indicated in FIGURE 6, or may be loosely affixed thereto as indicated in FIGURES 8 and 9.

The steering of the drive unit may be accomplished by lateral movement of steering handle 96 which may be somewhat flexible to absorb vibration. The tilting of the drive unit with respect to hull 71, that is, rotation of the drive unit about a horizontal transverse axis with respect to the hull may be controlled by hand pressure exerted downwardly or upwardly on steering handle 96.

Sharp pointed members 33 are preferably provided on the periphery of wheels 75 and 75' to provide for improved engagement with ice on which the vehicle is operated. Engagement pressure of wheels 75 and 75' with such an ice surface is controlled substantially entirely by the gravitational weight of the drive unit of which the wheels and the housing 74 and the motor therewithin are parts.

Referring now to FIGURES 8, 9, 10 and 11, there is shown a modification of the embodiment of FIGURES 5, 6 and 7 wherein wheel 85 corresponds to wheel 75 and wheels 85' correspond to wheels 75', but the blades on the wheels such as blades 88 on wheel 85 are angularly disposed, that is, are slanted or extend spirally. Extending shaft portions 78' and 78" on which wheels 85 are affixed are connected to the shaft 78 by flexible connecting means 87 which permit angular movement of the extending portions such as 78' with respect to shaft 78 as shown in FIGURE 9, in order to permit the outer wheels 85' to adapt themselves to varying terrain features over which the vehicle may be driven so that maximum engagement with the surface of all three wheels will be maintained to a maximum extent. Each of the outer edges 88' of blade 88 as shown in FIGURE 10 may be provided with a plurality of removable members having sharp extending portions to engage the ice. Thus a member such as member 89 may be located at each of a plurality of positions along blade tip 88' as indicated by arrows 90 and may be affixed in place by one or more screws or other suitable means.

Outboard of wheels 85' there may be provided on stub shafts 78' and 78" wheels such as wheels 86 having sharp ice engaging points 33 on their peripheries.

It may thus be seen that the invention is broad in scope and includes such modifications as will be apparent to those skilled in the art and is to be limited only by the claims.

Having thus described my invention, I claim:

1. In combination with an elongated vehicle having a stern and a bow, said vehicle floatable on water,
   drive means which comprises:
   an air cooled engine at the stern of the vehicle,
   at least one driving wheel,
   supporting means to support said wheel on a shaft below said motor, the axis of said shaft being in fixed relation to the motor; said wheel being rotatable about the axis of said shaft,
   means for said motor to drive said wheel rotatably,
   said wheel provided with paddle blade members, said wheel further provided with sharp ice engaging pointed portions, mounting means for detachably connecting said drive means to said vehicle at the stern of said vehicle, means connecting said drive means to said mounting means to provide for rotation of said drive means in a mode corresponding to yaw with respect to said vehicle, the axis of such yaw rotation being at the stern of the vehicle, said drive means hingedly attached to said mounting means to rotate on a transverse axis with respect to said vehicle.

2. The combination of claim 1 wherein said vehicle is a hull having a transom and both of said axes are abaft said transom.

3. The combination of claim 2 wherein said mounting means are clamp means.

4. The combination of claim 1 wherein said drive means is attached to said mounting means to rotate in three modes with respect to said vehicle.

5. The device of claim 3 wherein engagement pressure of said wheel with said ice is provided by the action of gravitational force on the mass of said drive means, said mass including the weight of said motor, said supporting means and said wheel, and the same force causes at least a substantial lower portion of the wheel to be immersed in water when the vehicle floats upon water.

6. The device of claim 3 wherein the engagement force between the engagement of said wheel and ice on which the vehicle is operated is provided by the forward thrust of said wheel acting on said ice to cause said unit to rotate about said horizontal axis to bring said wheel closer to said transom and at the same time to raise said transom above the ice and the same force acts to submerge the paddles of said wheel in water when operating on water.

7. The device of claim 5 wherein said ice engaging members are pointed members on the edges of said paddle blades.

8. The device of claim 6 wherein said ice engaging members are pointed members on the edges of said paddle blades.

9. The device of claim 5 wherein said ice engaging members are pointed members disposed circumferentially at the ends of said wheel.

10. The device of claim 6 wherein said ice engaging members are pointed members disposed circumferentially at the ends of said wheel.

11. The device of claim 3 wherein three of said wheels are provided.

12. The device of claim 3 wherein two of said wheels are provided.

13. The device of claim 3 wherein only one wheel is provided.

References Cited by the Examiner
UNITED STATES PATENTS

| | | | |
|---|---|---|---|
| 2,281,549 | 5/42 | Arnold | 115—18 |
| 2,812,737 | 11/57 | Hoover | 115—50 X |

MILTON BUCHLER, *Primary Examiner.*